INVENTOR.
MARVIN A. BERG
BY Alexander Riaboff
HIS ATTORNEY

Nov. 22, 1949 M. A. BERG 2,488,656
BUTTER CUTTER
Filed April 9, 1946 3 Sheets-Sheet 2

INVENTOR.
MARVIN A. BERG
BY Alexander Riaboff
HIS ATTORNEY

Nov. 22, 1949    M. A. BERG    2,488,656
BUTTER CUTTER
Filed April 9, 1946    3 Sheets-Sheet 3
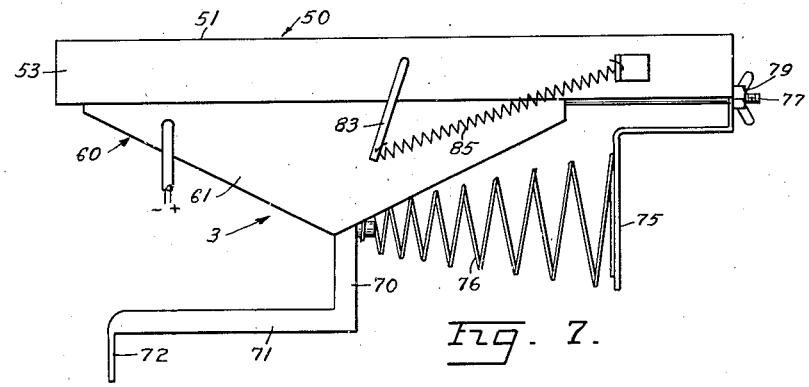
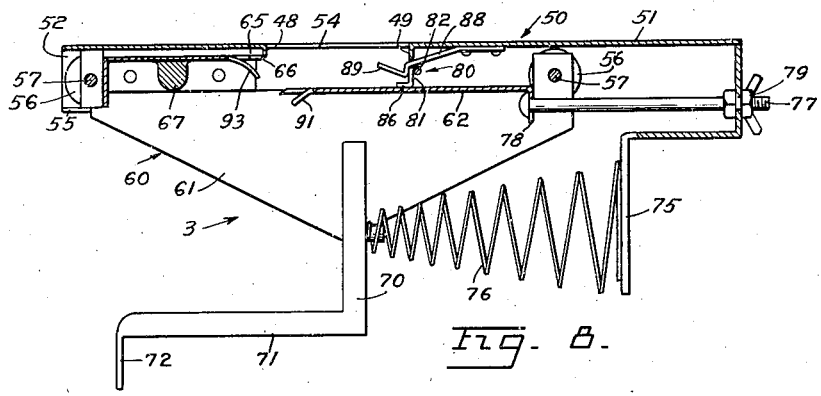
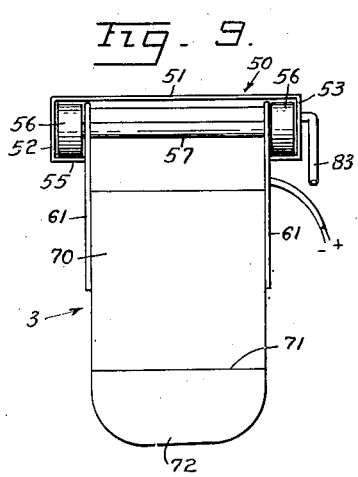
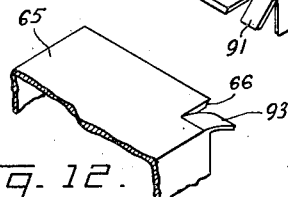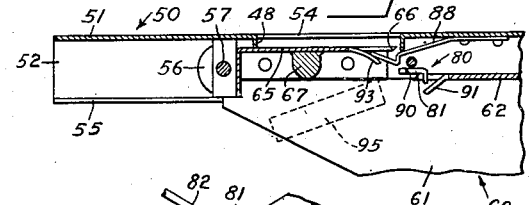
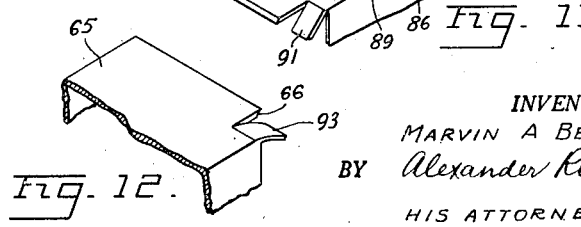
INVENTOR.
MARVIN A BERG
BY Alexander Riaboff
HIS ATTORNEY Patented Nov. 22, 1949

2,488,656

UNITED STATES PATENT OFFICE 2,488,656

BUTTER CUTTER

Marvin A. Berg, Oakland, Calif.

Application April 9, 1946, Serial No. 660,788

1 Claim. (Cl. 31—21)

This invention relates to apparatus for cutting butter into small pats for restaurants, cafeteria and the like use. The object of this invention is to provide a butter cutter which possessses a considerable capacity and in which butter is preserved in a chilled condition for a considerable time. Another object of this invention is to provide a butter cutter, which has a readily removable butter cutting unit, so that the latter may be easily cleaned, disinfected, if necessary, and returned in its place.

Another object of this invention is to provide a butter cutter in which the butter cutting blade is electrically heated and works in cooperation with a pat ejecting mechanism which ejects said pat off the blade with every cutting.

Other objects and advantages will appear as the specification proceeds and the novel features of the device will be particularly pointed out in the claim hereto annexed.

In this specification and the annexed drawing, the invention is illustrated in the form considered to be the best, but it is understood, that the invention is not limited to such form; and it is also to be understood that in and by the claims following the description, it is desired to cover the invention in whatsoever form it may be embodied.

My invention is illustrated in the accompanying drawing in which:

Fig. 7 is a side view of the butter cutting mechanism.

Fig. 8 is a vertical cross-section taken along the line 8—8 of the Fig. 5.

Fig. 9 is a front view of the butter cutting mechanism.

Fig. 10 is a partial cross-section of said mechanism showing the position of various parts after a pat of butter was cut off.

Fig. 11 is a perspective view of the pat ejecting mechanism; and

Fig. 12 is a perspective view of the blade.

Figures 1, 2:
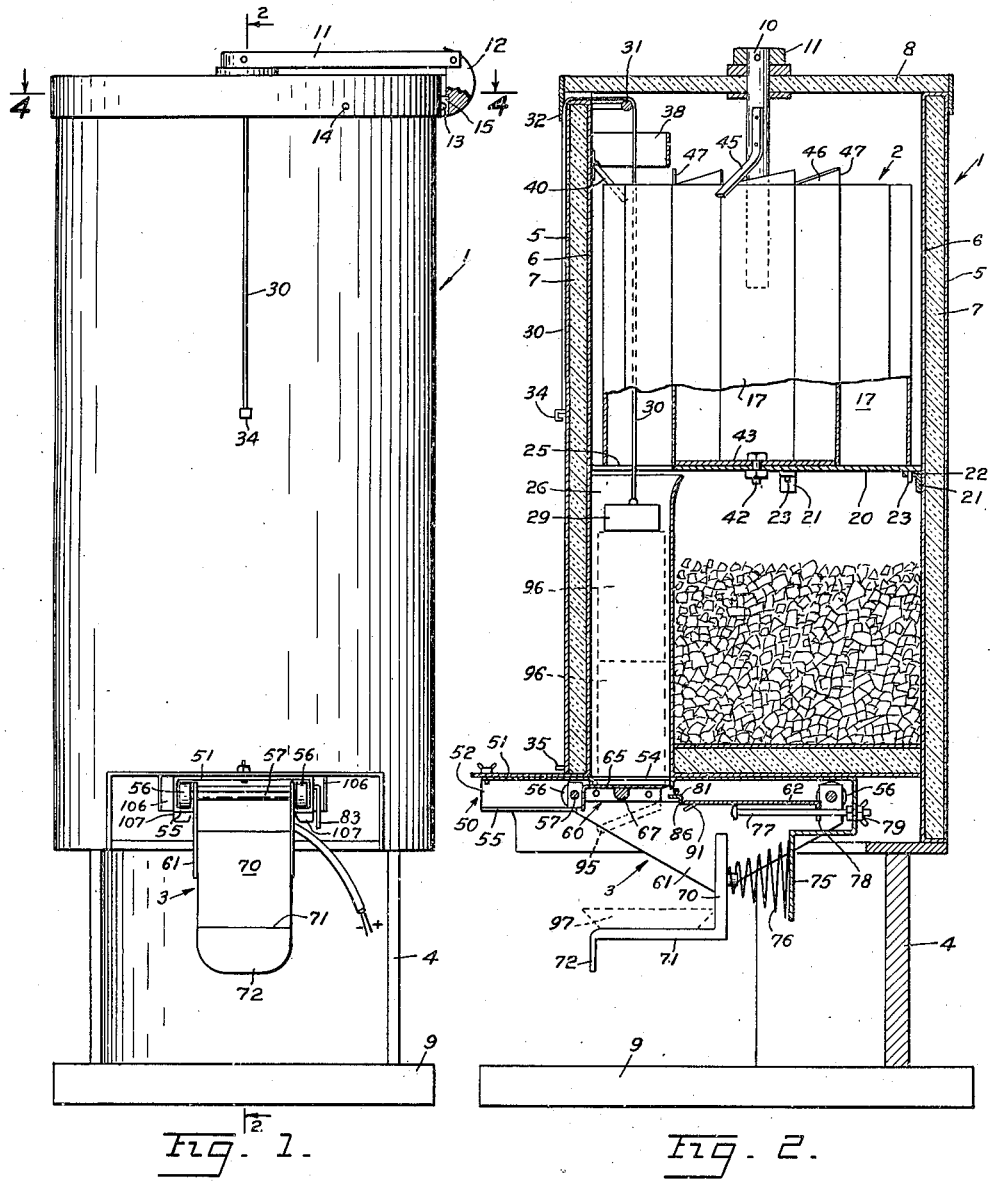
Fig. 1 is a front view of the butter cutter.
Fig. 2 is a vertical cross-section along the line 2—2 of the Fig. 1.
Figure 3:
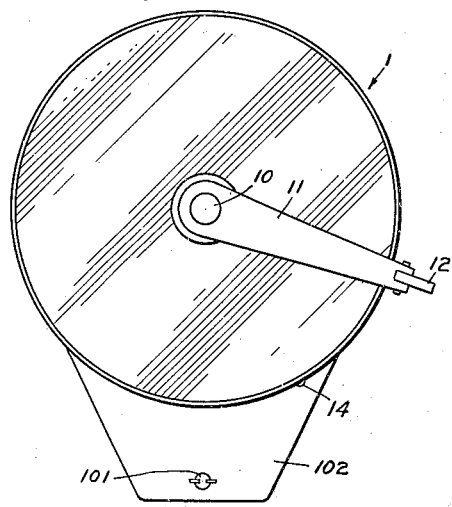
Fig. 3 is a plan view of the device.
Figure 4:
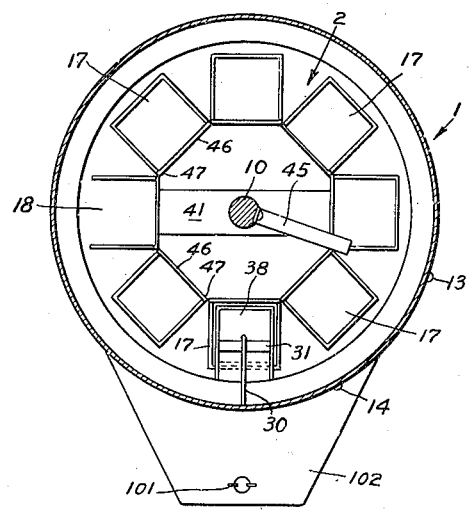
Fig. 4 is a horizontal cross-section taken along the line 4—4 of the Fig. 1.
Figure 5:
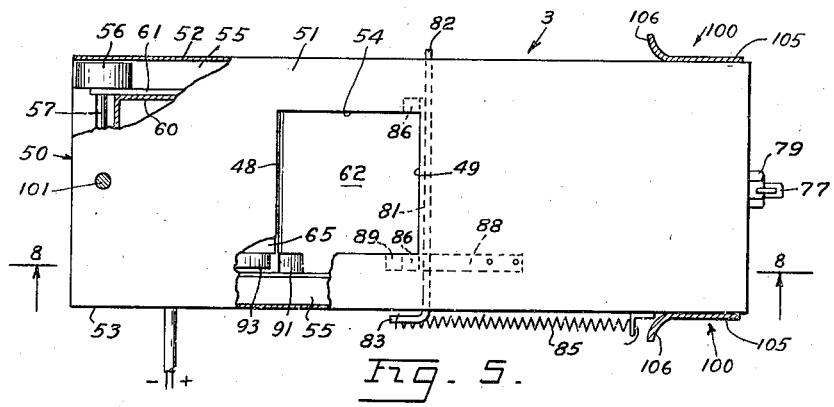
Fig. 5 is a plan view of the butter cutting mechanism.

In detail, my butter cutter consists of a container 1, a butter dispensing unit 2 inside of said container, and a butter cutting mechanism 3 under said container.

The container 1 is cylindrical in shape and preferably made of sheet metal having double walls 5 and 6 and a layer of insulating material 7 therebetween. The top of the container 1 is closed preferably by a transparent cover 8. The latter has a stub-shaft 10 passing through the center thereof and extending downwardly a certain distance. The top of said shaft, protruding above said cover 8, is rigidly connected to a handle 11, which extends parallel to said cover to and beyond the outer edge thereof. The handle 11 swingably carries on the free end thereof a stop 12 which in cooperation with two embossments 13 and 14 arranged on the outer wall 5, fixes two positions of said handle by admitting either of said embossments into a small indentation 15 provided thereon. The container 1 rests on an arcuated support 4 which is embedded in a base 9.

The upper portion of the container 1 is occupied by the butter dispensing unit 2. The latter comprises a plurality of rectangular chutes 17 arranged close to the inner wall 6 of the container. Each chute 17 is adapted to contain a plurality of cubes, or blocks, of butter which are placed thereinto through an open top. Each chute 17 has four vertical walls, with exception of the chute 18 which has only three walls, the fourth wall, facing the container, being omitted for the purpose to be explained hereafter.

The butter dispensing unit 2 rests on a disk 20 which is supported substantially in the middle of the container 1 by lugs 21 carried by the inner wall 6. Means is provided to prevent rotation of said disk, said means may include holes 22 in said lugs 21 and pins 23 carried by the underside of said disk, which pins pass through said holes 22, thus preventing the rotary displacement of said disk.

The disk 20 has a square opening 25, under which an outlet chute 26 is provided. When one of the chutes 17 is lined up with the opening 25, the cubes of butter in such chute drop through said opening into said outlet chute 26 and down into the cutting mechanism 3. The lower portion of the container 1 where the outlet chute 26 is located is packed with ice for the purpose of chilling butter.

In order to keep butter cubes under certain pressure while they are cut, a weight 29 is provided which weight is normally suspended on a cable 30 which is passed over a rod 31, through a hole 32, outside said container. The free end of said cable may carry a hook 34 which may be engaged by a loop 35 at the bottom of said container for the purpose of holding said weight 29 above said chutes. The weight 29 when lifted above the chutes 17 enters a rectangular enclosure 38 which keeps the same in constant alignment with said chutes. The cable 30 is of such length that when the hook 34 abuts the hole 32, the bottom of the weight 29 is level with the bottom of the outlet chute 26.

Figure 6:
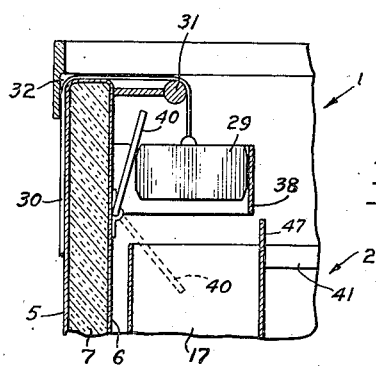
Fig. 6 is a partial vertical cross-section of the container showing means for alignment of the weight and one of the chutes.

Means is provided to align said chutes with the enclosure 32 and the outlet chute 26, which means comprise a fork 40 swingably carried by the inner wall 6 near the bottom of said enclosure and within the latter. When the weight 29 is raised it swings the fork 40 upwardly as shown in Fig. 6. When the weight 29 is dropped into one of the chutes 17 the fork 40 drops down in a position shown in Fig. 2 wherein it enters the top of said chute and prevents the butter dispensing unit 2 from rotating. Whenever it is desirable to take the unit 2 out of the container, the chute 18 is aligned with the weight enclosure 38. The absence of this front wall in said chute 18 permits removal of the unit 2 from said container by lifting the first from the latter.

The unit 2 is adapted to be rotated about a stub-shaft 10 passing through a channel 41 connecting two opposite chutes 17 at the top, and about a stub-shaft 42 carried by the bottom 43 of said unit and passing through said disk 20. The rotation of said unit 2 about said stub-shafts 10 and 42 is accomplished by the handle 11 in the following manner. The stop 12 is disengaged from the embossment 13, and the handle 11 is moved in a clockwise direction until the stop 12 is lined up with the embossment 14. The stub-shaft 10 rotates with the handle 11. It carries a leaf spring 45 affixed thereto, which spring extends over the inner walls 46 of the chutes 17. The walls 46 have one of their sides raised so as to form a tooth 47. The latter is engaged by the spring 45 on its clockwise movement and the unit 2 is rotated in the same direction. The chute 17 is placed in alignment with the weight 29 and the outlet chute 26 when the stop 12 is aligned with the embossment 14. On its backward movement the spring 45 slides over the tooth 47 of the next chute 17 and engages the same when the stop 12 is brought into the alignment with the embossment 13.

The butter cutting mechanism 3 is a separate unit which may be easily disengaged from the container 1 for the purpose of cleaning, disinfection or repairs. It is removably attached to the bottom of the container 1 and includes a frame 50 made of sheet metal. The latter frame is rectangular and channel-shaped having a top 51 and the side walls 52 and 53. The top 51 has a rectangular opening 54 therein which is aligned with the outlet chute 26. The opening 54 is formed with a front rim 48 and a rear rim 49. The side walls 52 and 53 have their lower portions bent inwardly, so as to form a pair of supports 55 for the roller bearings 56 confined within said frame. There are two pairs of said bearings, each pair having a common shaft 57. The latter shafts carry a slicer 60 which consists of two side walls 61 extending downwardly beyond the frame 50 and being connected by a top plate 62.

The slicer 60 carries a cutter blade 65 in the front part thereof fixedly attached thereto. The blade 65 is slightly spaced from the top 51 of the frame and has its cutting edge 66 bevelled so as to force the sliced pat of butter downwardly.

The blade 65 carries an electric heating coil 67 extending the width thereof by means of which the slicer is kept warmed up to expedite the cutting of pats and to produce a clean cut. The butter block drops through the opening 54 in the top of the frame 50, and rests on the plate 62.

The blade 65 is placed a certain distance above said plate and this distance determines the thickness of the butter pats to be sliced.

The slicer side walls 61 are connected by a partition 70 to the lower end of which a platform 71 is attached for manual operation of said slicer. The platform 71 extends forwardly so that the front end thereof is substantially in line with the front end of the frame 50 and terminates with a push handle 72.

The frame 50 has an end plate 75 extending downwardly from the rear end thereof. A spring 76 is arranged between the partition 70 and the plate 75 which spring pushes the slicer 60 forwardly, but forward movement of said slicer is limited to the position shown in Figures 7 and 8 by a bolt 77 which passes through a lug 78 integral with the top plate 62 and is firmly secured to the end plate 75 by nuts 79. This arrangement permits the slicer 60 to be manually pushed inwardly and be returned to its initial portion by the spring 76.

When a butter pat is sliced off by pushing the slicer 60 as above-described, it has tendency to stick to the end of the blade 65. In order to facilitate the separation of said pats from the blade 65, an ejection mechanism 80 is provided. The latter mechanism is carried by the frame 50 and is arranged under the rim 49 of the opening 54. The mechanism 80 consists of an ejector plate 81 extending substantially all the width of the opening 54 at the right angle to the top plate 62, said ejector plate being fixedly attached to a shaft 82 carried by said frame 50. One end 83 of said shaft is extended beyond said frame and is bent downwardly as shown in Fig. 7. A spring 85 is attached to said end 83 which spring normally tends to rotate the shaft 82 in counter-clockwise direction. The plate 81 has two forwardly bent portions 86 which freely rest on the top plate 62. A spring catch 88 is attached to the top 51 of the frame 50 and has a bent portion 89 which engages a reduced portion 90 of the plate 81 and thus prevents said shaft 82 from rotating.

The top 62 has two downwardly bent prongs 91 on each side thereof which are aligned with the portions 86. The blade 65 is provided with a downwardly bent prong 93 which is designed to engage the portion 89 of the catch 88 on the inward movement of the blade 65 and lift said catch so as to release the plate 81 and the shaft 82. At that moment the portions 86 are over the prongs 91, and the tip of the blade 65 almost contacts the rim 49. The shaft 82 being freed from the catch 88 quickly rotates in counter-clockwise direction looking at Figures 7 and 9, and the plate 81 kicks the butter pat, cut off the butter block, thus freeing the blade 65 for a new cut.

The operation of the device is as follows: Ice is placed in the lower portion of the container 1. Then the unit 2 with the disk 20 are placed into the container 1, whereupon butter blocks are placed into the chutes 17 and the container 1 is closed with the cover 8. The handle 11 is moved in clock-wise direction until it coincides with the embossment 14, whereupon the butter blocks drop through the outlet chute 26 onto the slicer top plate 62. The weight 29 is dropped down on the butter blocks.

The slicer 60 is pushed inwardly by the handle 71. This motion slices a pat 95 from the bottom of a butter block 96 and said pat is kicked downwardly by the ejection plate 81. The butter cube rests temporarily on the blade 65. It shall be noted that when the blade 65 cuts the butter cube, the same is pressed against the rim 49 and the ejector plate 81. When the slicer 60 is pushed outwardly by the action of the spring 76, said butter cube is stopped from moving outwardly by the rim 48. The blade 65 slides out under the butter cube and the same drops onto the top 62 which again takes the position shown in Fig. 8.

When all the butter in a certain chute is used up, the next chute 17 is brought in registry with the outlet chute 26 and the slicing of pats is resumed as above-described. The sliced pat 95 drops into a butter plate or carton 97 placed on the platform 71.

The butter cutting mechanism 3 is suspended beneath the container 1 by retaining lugs 100 and a bolt 101 which passes through the top 51 and a canopy 102 in front of said container 1 and integral therewith. Each of the lugs 100 consists of a vertical wall 105 with a flared out position 106 and a horizontal support 107, adapted to engage the undersides of the supports 55 of the frame 50.

Whenever it is desired to take the butter cutting mechanism 3 out, the bolt 101 is unscrewed and said mechanism is pulled out.

To insert the mechanism 3 in the place, the same is pushed under the container 3. The rear end engages the lugs 100 and the flared out portions 106 direct the same to take the position therebetween. When the holes in the top 51 and the canopy 102 for the bolt 101 are aligned the latter is screwed in, thus securely fixing the position of the mechanism 3 in relation to the container 1.

Having thus described my invention, I claim:

In a butter cutter having means therein for storing, chilling and guiding downwardly butter blocks; a cutting mechanism for cutting pats off said butter blocks including a frame, a slicer adapted to be manually moved in said frame; said frame having an opening in the top thereof, said slicer having a plate upon which the butter blocks drop through said opening; a blade carried by said slicer and arranged above the plate; said blade carrying a heating element thereon; an ejector extending across said frame at the edge of said opening adapted to eject the butter pats cut off by said blade and adhering thereto, a spring means for rotating said ejector, said ejector having portions thereof resting on the top of said plate; a spring catch carried by said frame for preventing said ejector from rotating, means for releasing said catch and permitting said ejector to rotate, and prongs at the end of said plate for returning said ejector to its normal position.

MARVIN A. BERG.

REFERENCES CITED

The following references are of record in the file of this patent:

UNITED STATES PATENTS

| Number | Name | Date |
|---|---|---|
| 737,792 | Sutton | Sept. 1, 1903 |
| 813,375 | Glauser | Feb. 20, 1906 |
| 1,658,884 | Cusick | Feb. 14, 1928 |
| 2,174,772 | Berg | Oct. 3, 1939 |
| 2,232,749 | Wilson et al. | Feb. 25, 1941 |
| 2,282,735 | Merrick | May 12, 1942 |